(12) United States Patent
Carroll

(10) Patent No.: US 6,453,954 B1
(45) Date of Patent: Sep. 24, 2002

(54) OIL DAMAGE RE-DIRECTING DEVICE

(76) Inventor: Christopher A. Carroll, 15705 283RD St. E, Graham, WA (US) 98338

( * ) Notice: Subject to any disclaimer, the term of this patent is extended or adjusted under 35 U.S.C. 154(b) by 0 days.

(21) Appl. No.: 09/849,421

(22) Filed: May 4, 2001

(51) Int. Cl.[7] .............................................. B67C 11/00
(52) U.S. Cl. ........................................ 141/86; 141/341
(58) Field of Search ............................. 141/86, 97, 98, 141/331, 332, 333, 334, 340, 341, 342, 343

(56) References Cited

U.S. PATENT DOCUMENTS

| | | |
|---|---|---|
| D205,236 S | 7/1966 | Ilg et al. |
| 4,226,268 A | 10/1980 | Wasser |
| 4,332,282 A | 6/1982 | Strange |
| 4,338,984 A | 7/1982 | Kronberg et al. |
| 4,867,017 A | 9/1989 | Holman |
| 5,480,072 A | 1/1996 | Ripley |
| 6,227,263 B1 * | 5/2001 | Kust et al. ..................... 141/86 |

* cited by examiner

Primary Examiner—Gregory Huson
Assistant Examiner—Peter deVore

(57) ABSTRACT

A oil drainage re-directing device for preventing oil from dripping on a U-joint when an oil filter is removed. The oil drainage re-directing device includes a panel having a top surface, a bottom surface, a back edge, a front edge, a first side edge and a second side edge. The panel is divided into a left portion and a right portion along a longitudinal axis of the panel. The left portion is in an angular relationship with the right portion such that the top surface of the panel defines an angle generally between 120 degrees and 150 degrees. The panel comprises a substantially rigid material. A foot is attached to the bottom surface of the panel and is positioned generally between the front and back edges. The panel is positioned on a U-joint of a vehicle and under an oil-filter for preventing oil from falling on the oil-filter when the oil filter is removed.

9 Claims, 2 Drawing Sheets

OIL DAMAGE RE-DIRECTING DEVICE

BACKGROUND OF THE INVENTION

1. Field of the Invention

The present invention relates to devices used when changing a vehicle's oil and more particularly pertains to a new oil drainage re-directing device for preventing oil from dripping on a U-joint when an oil filter is removed.

2. Description of the Prior Art

The use of devices used when changing a vehicle's oil is known in the prior art. More specifically, devices used when changing a vehicle's oil heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,332,282; U.S. Pat. No. 5,480,072; U.S. Pat. No. 4,226,268; U.S. Pat. No. 4,338,984; U.S. Pat. No. 4,867,017; and U.S. Des. Pat. No. 205,236.

While these devices fulfill their respective, particular objectives and requirements, the aforementioned patents do not disclose a new oil drainage re-directing device. The inventive device includes a panel having a top surface, a bottom surface, a back edge, a front edge, a first side edge and a second side edge. The panel is divided into a left portion and a right portion along a longitudinal axis of the panel. The left portion is in an angular relationship with the right portion such that the top surface of the panel defines an angle generally between 120 degrees and 150 degrees. The panel comprises a substantially rigid material. A foot is attached to the bottom surface of the panel and is positioned generally between the front and back edges. The panel is positioned on a U-joint of a vehicle and under an oil-filter for preventing oil from falling on the oil-filter when the oil filter is removed.

In these respects, the oil drainage re-directing device according to the present invention substantially departs from the conventional concepts and designs of the prior art, and in so doing provides an apparatus primarily developed for the purpose of preventing oil from dripping on a U-joint when an oil filter is removed.

SUMMARY OF THE INVENTION

In view of the foregoing disadvantages inherent in the known types of devices used when changing a vehicle's oil now present in the prior art, the present invention provides a new oil drainage re-directing device construction wherein the same can be utilized for preventing oil from dripping on a U-joint when an oil filter is removed.

The general purpose of the present invention, which will be described subsequently in greater detail, is to provide a new oil drainage re-directing device apparatus and method which has many of the advantages of the devices used when changing a vehicle's oil mentioned heretofore and many novel features that result in a new oil drainage re-directing device which is not anticipated, rendered obvious, suggested, or even implied by any of the prior art devices used when changing a vehicle's oil, either alone or in any combination thereof.

To attain this, the present invention generally comprises a panel having a top surface, a bottom surface, a back edge, a front edge, a first side edge and a second side edge. The panel is divided into a left portion and a right portion along a longitudinal axis of the panel. The left portion is in an angular relationship with the right portion such that the top surface of the panel defines an angle generally between 120 degrees and 150 degrees. The panel comprises a substantially rigid material. A foot is attached to the bottom surface of the panel and is positioned generally between the front and back edges. The panel is positioned on a U-joint of a vehicle and under an oil-filter for preventing oil from falling on the oil-filter when the oil filter is removed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oil drainage re-directing device apparatus and method which has many of the advantages of the devices used when changing a vehicle's oil mentioned heretofore and many novel features that result in a new oil drainage re-directing device which is not anticipated, rendered obvious, suggested, or even implied by any of the prior art devices used when changing a vehicle's oil, either alone or in any combination thereof.

It is another object of the present invention to provide a new oil drainage re-directing device which may be easily and efficiently manufactured and marketed.

It is a further object of the present invention to provide a new oil drainage re-directing device which is of a durable and reliable construction.

An even further object of the present invention is to provide a new oil drainage re-directing device which is susceptible of a low cost of manufacture with regard to both materials and labor, and which accordingly is then susceptible of low prices of sale to the consuming public, thereby making such oil drainage re-directing device economically available to the buying public.

Still yet another object of the present invention is to provide new oil drainage re-directing device which provides in the apparatuses and methods of the prior art some of the advantages hereof, while simultaneously overcoming some of the disadvantages normally associated therewith.

Still another object of the present invention is to provide a new oil drainage re-directing device for preventing oil from dripping on a U-joint when an oil filter is removed. Yet another object of the present invention is to provide a new oil drainage re-directing device which includes a panel having a top surface, a bottom surface, a back edge, a front edge, a first side edge and a second side edge. The panel is divided into a left portion and a right portion along a longitudinal axis of the panel. The left portion is in an angular relationship with the right portion such that the top surface of the panel defines an angle generally between 120 degrees and 150 degrees. The panel comprises a substantially rigid material. A foot is attached to the bottom surface of the panel and is positioned generally between the front and back edges. The panel is positioned on a U-joint of a vehicle and under an oil-filter for preventing oil from falling on the oil-filter when the oil filter is removed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
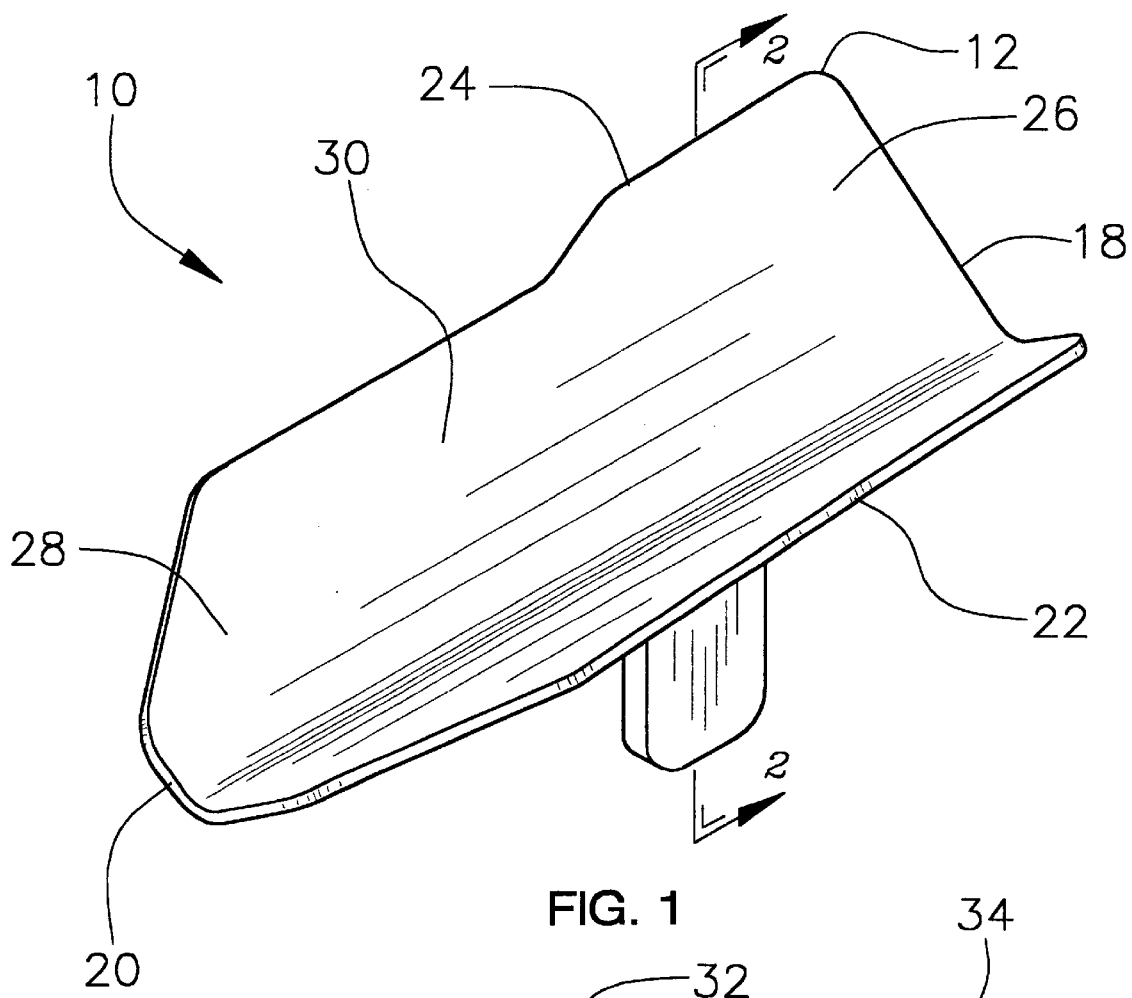
FIG. 1 is a schematic perspective view of a new oil drainage re-directing device according to the present invention.
Figure 2:
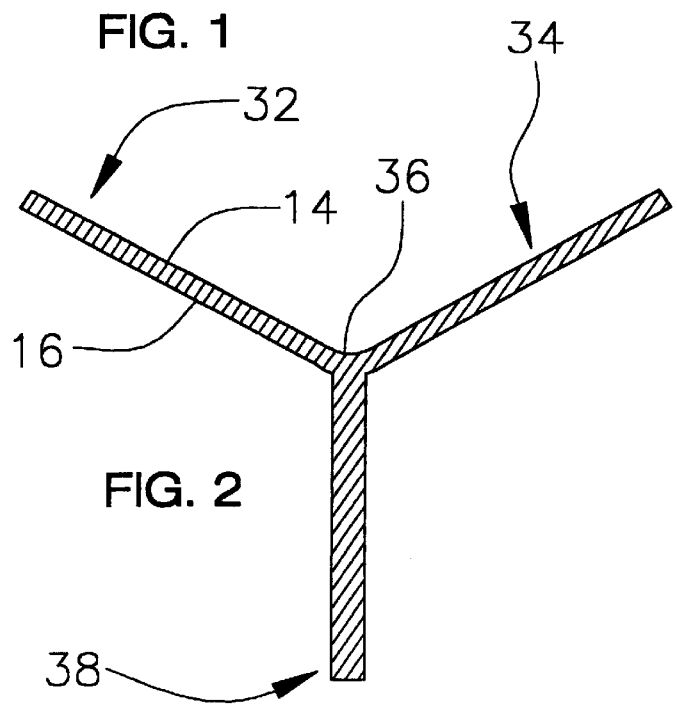
FIG. 2 is a schematic cross-sectional view taken along line 2—2 of FIG. 1 of the present invention.
Figure 3:
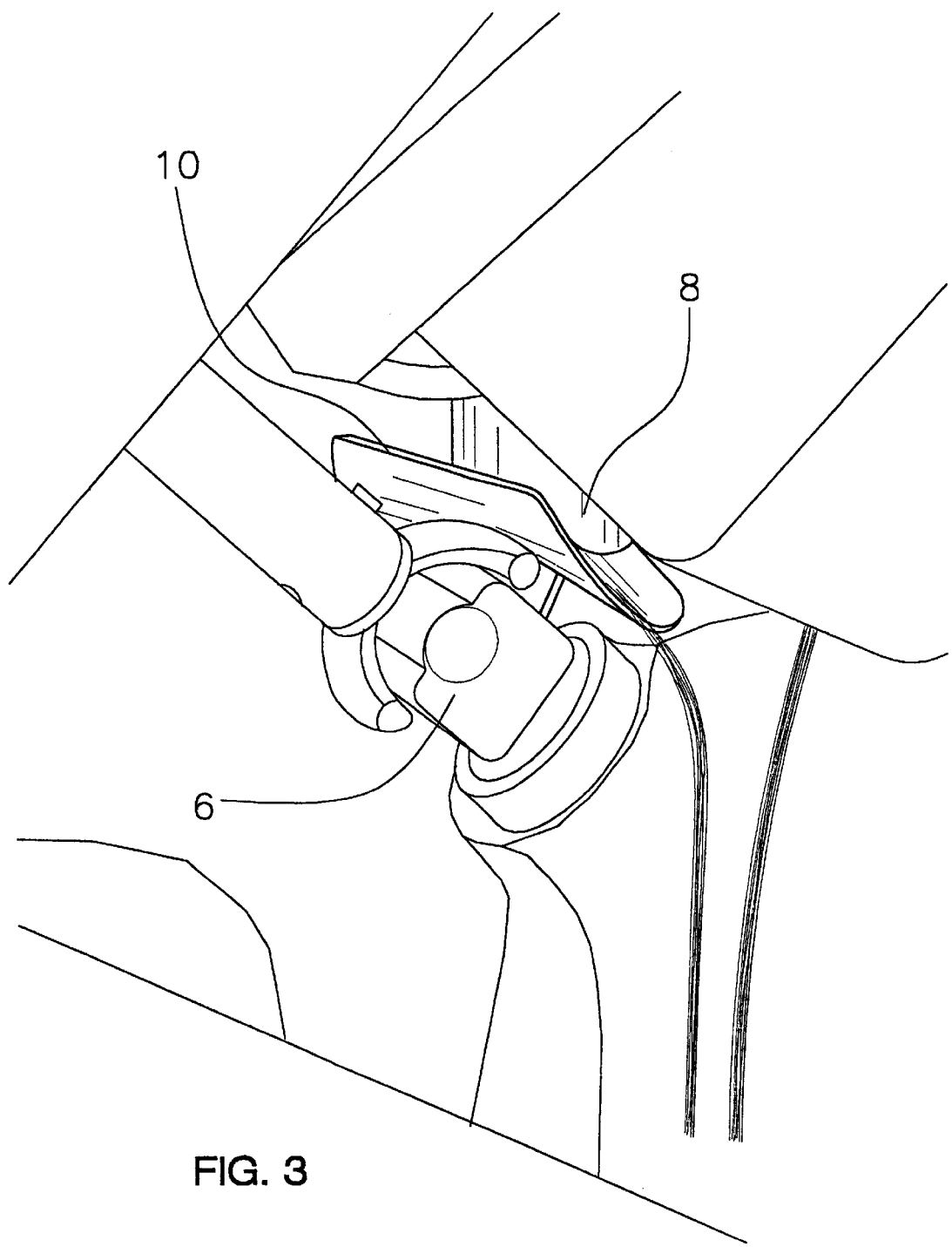
FIG. 3 is a schematic in-use view of the present invention.

With reference now to the drawings, and in particular to FIGS. 1 through 3 thereof, a new oil drainage re-directing device embodying the principles and concepts of the present invention and generally designated by the reference numeral 10 will be described.

As best illustrated in FIGS. 1 through 3, the oil drainage re-directing device 10 generally comprises a panel 12 having a top surface 14, a bottom surface 16, a back edge 18, a front edge 20, a first side edge 22 and a second side edge 24. The panel 12 is generally divided into a first portion 26 abutting the back edge, a second portion 28 abutting the front edge 20 and a middle portion 30 positioned between the first 26 and second 28 portions. The side edges 22, 24 taper inward at a juncture of the first 26 and middle 30 portions such that a width of the first portion 26 is greater than a width of the middle portion 30. The side edges 22, 24 of the second portion 28 tapers toward the front edge 20. The back edge 18 has a width preferably between 3 inches and 4 inches, and the front edge 30 has a width preferably between ½ inch and 1 inch. The panel 12 has a length from the front edge 20 to the back edge 18 ideally between 7 inches and 8 inches. The panel 12 is divided into a left portion 32 and a right portion 34 along a longitudinal axis 36 of the panel 12. The left portion 32 is in an angular relationship with the right portion 34 such that the top surface 14 of the panel 12 defines an angle generally between 120 degrees and 150 degrees. The panel 12 preferably is comprised of a rigid, plastic material.

A foot 38 is attached to the bottom surface 16 of the panel 12. The foot 38 comprises a plate having a peripheral edge attached to the bottom surface and extending along the longitudinal axis 36 of the panel 12 such that a plane of the plate, or foot 38, is orientated generally parallel to the longitudinal axis 36. The foot 38 is attached to the middle portion 30 of the panel 12. The foot 38 extends generally about 1 inch away from the bottom surface 16 of the panel.

In use, the device is used for redirecting oil spillage on a front U-joint 6 of a vehicle when removing an oil filter 8 from the vehicle. The panel 12 is positioned on the U-joint 6 and under the oil-filter 8 for preventing oil from falling on the oil-filter. The foot 38 is abutted against a vertical edge of the U-joint 6 for stability. Ideally, the device is used on the K1500 through the K3500 series of trucks manufactured from approximately 1985 to 1999 by the General Motors Corporation which position the oil filter directly above the U-joint. When the oil filter 8 is removed, some oil drips on the U-joint 6. When the vehicle is moved to a different location, the oil on the U-joint 6 drips onto the ground surface giving the impression of on oil leak. The device 10 prevents the oil from hitting the U-joint 6 and directs toward a container being used to hold the oil.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An oil directing device for redirecting oil spillage on a front U-joint of a vehicle when removing a oil filter from the vehicle, said device comprising:

a panel having a top surface, a bottom surface, a back edge, a front edge, a first side edge and a second side edge, said panel being divided into a left portion and a right portion along a longitudinal axis of said panel, said left portion being in an angular relationship with said right portion such that said top surface of said panel defines an angle generally between 120 degrees and 150 degrees, said panel comprising a substantially rigid material;

a foot being attached to said bottom surface of said panel and positioned generally between said front and back edges;

wherein said panel is adapted to be positioned on said U-joint and under said oil-filter for preventing oil from falling on said oil-filter; and wherein said foot comprises a plate having a peripheral edge attached to said bottom surface and extending along said longitudinal axis of said panel such that a plane of said plate is orientated generally parallel to said longitudinal axis.

2. The oil directing device as in claim 1, wherein said panel is generally divided into a first portion abutting said back edge, a second portion abutting said front edge and a middle portion positioned between said first and second portions, said side edges tapering inward at a juncture of said first and middle portions such that a width of said first portion is greater than a width of said middle portion.

3. The oil directing device as in claim 2, wherein said side edges of said second portion taper toward said front edge.

4. The oil directing device as in claim 3, wherein said back edge has a width generally between 3 inches and 4 inches, said front edge having a width generally between ½ inch and 1 inch.

5. The oil directing device as in claim 3, wherein said panel has a length from said front edge to said back edge generally between 7 inches and 8 inches.

6. The oil directing device as in claim 1, wherein said panel has a length from said front edge to said back edge generally between 7 inches and 8 inches.

7. An oil directing device for redirecting oil spillage on a front U-joint of a vehicle when removing a oil filter from the vehicle, said device comprising:

a panel having a top surface, a bottom surface, a back edge, a front edge, a first side edge and a second side edge, said panel being divided into a left portion and a right portion along a longitudinal axis of said panel, said left portion being in an angular relationship with said right portion such that said top surface of said panel defines an angle generally between 120 degrees and 150 degrees, said panel comprising a substantially rigid material;

a foot being attached to said bottom surface of said panel and positioned generally between said front and back edges;

wherein said panel is adapted to be positioned on said U-joint and under said oil-filter for preventing oil from falling on said oil-filter;

wherein said panel is generally divided into a first portion abutting said back edge, a second portion abutting said front edge and a middle portion positioned between said first and second portions, said side edges tapering inward at a juncture of said first and middle portions such that a width of said first portion is greater than a width of said middle portion; and wherein said foot comprises a plate having a peripheral edge attached to said bottom surface and extending along said longitudinal axis of said panel such that a plane of said plate is orientated generally parallel to said longitudinal axis, said foot being attached to said middle portion of said panel.

8. The oil directing device as in claim 7, wherein said foot extends about 1 inch away from said bottom surface of said panel.

9. An oil directing device for redirecting oil spillage on a front U-joint of a vehicle when removing a oil filter from the vehicle, said device comprising:

a panel having a top surface, a bottom surface, a back edge, a front edge, a first side edge and a second side edge, said panel being generally divided into a first portion abutting said back edge, a second portion abutting said front edge and a middle portion positioned between said first and second portions, said side edges tapering inward at a juncture of said first and middle portions such that a width of said first portion is greater than a width of said middle portion, said side edges of said second portion tapering toward said front edge, said back edge having a width generally between 3 inches and 4 inches, said front edge having a width generally between ½ inch and 1 inch, said panel having a length from said front edge to said back edge generally between 7 inches and 8 inches, said panel being divided into a left portion and a right portion along a longitudinal axis of said panel, said left portion being in an angular relationship with said right portion such that said top surface of said panel defines an angle generally between 120 degrees and 150 degrees, said panel comprising a plastic material;

a foot being attached to said bottom surface of said panel, said foot comprising a plate having a peripheral edge attached to said bottom surface and extending along said longitudinal axis of said panel such that a plane of said plate is orientated generally parallel to said longitudinal axis, said foot being attached to said middle portion of said panel, said foot extending about 1 inch away from said bottom surface of said panel; and wherein said panel is adapted to be positioned on said U-joint and under said oil-filter for preventing oil from falling on said oil-filter.

\* \* \* \* \*